Oct. 26, 1954

R. A. FISCHER ET AL

2,692,546

RATIO CONTROL LOCKOUT

Filed April 7, 1950

INVENTORS
RICHARD A. FISCHER
ROBERT A. ARTHUR
BY

ATTORNEY

Oct. 26, 1954

R. A. FISCHER ET AL 2,692,546

RATIO CONTROL LOCKOUT

Filed April 7, 1950

INVENTORS
RICHARD A. FISCHER
ROBERT A. ARTHUR
BY

ATTORNEY

Oct. 26, 1954  R. A. FISCHER ET AL  2,692,546
RATIO CONTROL LOCKOUT

Filed April 7, 1950  3 Sheets-Sheet 3

Fig. 4.

INVENTORS
RICHARD A. FISCHER
ROBERT A. ARTHUR
BY

ATTORNEY

Patented Oct. 26, 1954

2,692,546

UNITED STATES PATENT OFFICE 2,692,546

RATIO CONTROL LOCKOUT

Richard A. Fischer, Los Angeles, and Robert A. Arthur, Culver City, Calif., assignors to The Garrett Corporation, Los Angeles, Calif., a corporation of California Application April 7, 1950, Serial No. 154,554

26 Claims. (Cl. 98—1.5)

This invention relates generally to pressure control means for enclosures, and relates more particularly to means for controlling pressure in such enclosures as aircraft cabins.

The present invention is useful in various connections but has particular utility in the control of air pressure in enclosures, and by way of example there is shown and described herein pressure control mechanism embodying the present invention incorporated in pressure regulators of different types for controlling the pressure in a pressurized aircraft cabin.

It is to be understood, of course, that the present invention is not limited to use in connection with such regulators but may also be embodied in other types of regulating mechanisms.

Under normal flight conditions it has been found to be generally desirable, at high altitudes, to control the pressure in the cabin at a substantially fixed predetermined differential with respect to ambient atmospheric pressure.

However, in military aircraft serious problems may be encountered with such fixed differential control in the event of a major perforation of the wall of the pressurized cabin during combat operations at high altitudes when the pressure in the cabin is very much higher than that of ambient atmospheres. If the area of perforation is sufficiently large, cabin pressure may drop at such a rapid rate that the occupants cannot maintain normal and rational bodily and mental functioning.

The problems of maintaining rational functioning of the military personnel of a combat plane under such conditions can be partially solved by providing equipment for the controlled supply of breathing oxygen, and such equipment is available. Thus, a plane may continue to operate at altitudes above the limits where ambient atmosphere is capable of furnishing an adequate oxygen supply for breathing purposes. However, such equipment does not completely solve the problems mentioned above. The seriousness of these problems is proportional to the magnitude of the ratio of cabin to ambient atmospheric pressure for which the pressure regulating apparatus is set to operate at the higher altitudes. Consequently, these problems may be dealt with by providing for use in conjunction with the oxygen apparatus, means for reducing to a suitable value the difference between cabin pressure and that of ambient atmosphere during combat operations so as to prevent exceeding the above mentioned ratio.

It is therefore an object of the present invention to provide pressure regulating means for maintaining the best pressure conditions for the occupants of the cabin under the various operating conditions which may be encountered.

It is another object of the present invention to provide means of this character whereby at high altitudes cabin pressure may be selectively controlled at a predetermined substantially fixed differential with respect to ambient atmosphere under normal flight conditions and at a predetermined ratio for combat conditions.

Another object of the invention is to provide a device of this character incorporating means for changing from a differential to a ratio control, the operation of which may be initiated manually by the pilot or other member of the personnel, and which is then adapted to automatically change the differential from a predetermined high limit to a predetermined ratio, or vice versa, depending upon the direction determined by the manual control.

When a plane enters combat it is desirable that the change from the high differential maintained by the differential control to the lower differences of pressure effected by the ratio control, be brought about with moderate rapidity, so that the ratio control becomes effective before the plane actually becomes subject to possible perforations from enemy fire. Should the wall of the cabin be ruptured to an extent such as to cause substantially instantaneous decompression (commonly referred to as explosive decompression), the effect upon the occupants would be injurious to an extent proportional to the altitude of the plane, and, at extremely high altitudes and high ratio, could be fatal. Accordingly, the invention contemplates the controlled reduction of cabin pressure at a rate of maximum rapidity consistent with the avoidance of injurious consequences.

The extent of the injurious effect of rapid decompression depends somewhat upon the value of the pressure difference between that in the cabin and ambient atmosphere at the lower limit. For this, and other reasons, it is desirable to adjust the value of this limit to meet varying conditions. It is also desirable to adjust the upper or maximum limit to which the differential may be raised, i. e., the normal value of the differential at high altitudes to correspond to the structural load limit of the cabin walls. A further object of the invention is to provide a regulator which, in addition to the above described features, permits the adjustment of both the differential and ratio control means.

A still further object of the invention is to provide a control of said character which is adapted to override the control which normally operates to maintain a fixed (normal) differential between cabin and ambient atmospheric pressures in at least one stage of operation of the regulating system. Thus the regulator would normally maintain a maximum differential in this stage of operation, but would be adapted, under manual control, to shift from the high differential control to the lower ratio control and back again while operating under external atmospheric conditions normally calling for the differential control.

The invention is particularly applicable to a commonly used method of pressurizing in which cabin pressure is permitted to remain substantially the same as atmospheric pressure until a predetermined altitude has been reached, is maintained at a substantially constant level between that altitude and a second predetermined and higher altitude, and, above said second predetermined altitude, is maintained at a substantially fixed normal differential relative to external atmosphere. In actual operation in such a system, the changer means will override not only the normal differential control, but also the isobaric control in that portion of the isobaric range wherein there is developed a ratio of cabin to ambient atmospheric pressure exceeding the determined ratio limit.

Another object is to provide a pressure regulating system embodying changer mechanism which is pneumatic in character for rapidly changing from the differential control to the ratio control and for slowly changing from the ratio to the differential control.

Still another object of the invention is to provide means of this character wherein a single electrically controlled valve controls pneumatic means.

A further object of the invention is to provide a pressure regulating system, which, in addition to the features described above, is incorporated in a pressure regulator which is of relatively simple and inexpensive construction, is very small and light in weight so as to add little to the weight of the plane in which it is installed; is dependable in operation irrespective of its position with reference to the horizontal; may be in the form of a self-contained unit capable of being furnished as a packaged article; is not affected by dirt, oil, water, or moisture; and has few close tolerances requiring precise machining operations.

Further objects and advantages of the invention will be brought out in the following part of the specification.

Referring to the drawings, which are for illustrative purposes only.

As an example of one type of pressure control mechanism in which the invention is embodied, there is shown in the drawing a pressure regulator adapted to control the outflow of air through an outlet 8 in the wall 9 of an aircraft cabin into which the air is pumped under pressure by suitable supercharging apparatus 10 or by a ram. The regulator is adapted to be disposed within the cabin 11, and said regulator includes a valve casing 12 having openings 13, 14, for the flow of air from the cabin into respective chambers 13a and 14a which communicate with an intermediate chamber 15 through valve apertures 16 controlled by a pair of valve elements 17. Intermediate chamber 15 communicates with the outlet 8 by means of a duct 15a. Thus air from the cabin may flow through the regulator to atmosphere. The valves 17 are carried by a shaft 19 which is supported between a flexible support member 20 (comprising one or more spiralled webs separated by slots) and a diaphragm 22. The diaphragm 22 is clamped to one end of the casing 12 by a casing section 23 which cooperates therewith to define a control chamber 24 in which is maintained a pressure normally substantially the same as the pressure in the cabin. The diaphragm 22 responds to differentials arising between cabin pressure which is exerted against its left side (as viewed in Fig. 1), and the pressure of the air in the control chamber 24, supplemented by the pressure of a relatively light spring 25, exerted against its right side. Because of the spring 25 the pressure in the chamber 24 is slightly below cabin pressure. Any tendency of cabin pressure to drop below the level determined by the pressure in the control chamber 24 will result in movement of the diaphragm 22 in valve closing direction, thus causing cabin pressure to rise to the proper level. Conversely, any excess of cabin pressure will result in valve opening movement, permitting cabin pressure to drop back to the level determined by the pressure in the control chamber 24.

Figure 1:
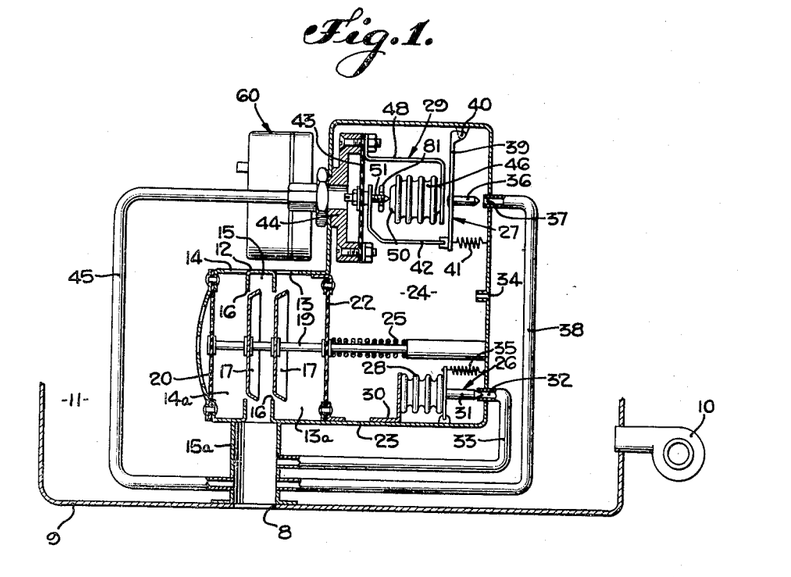
Fig. 1 is a schematic view of a pressure regulator embodying the present invention.

The pressure in the chamber 24 is controlled by pilot valves 26 and 27 which are adapted to bleed excess pressure from the chamber 24 in accordance with the response of a pressure responsive means or aneroid 28 and the pressure responsive mechanism of the combined differential and ratio control unit, indicated generally at 29, air from a source of higher pressure, such as the cabin 11, being bled into the chamber 24 through a restricted aperture 34.

The aneroid 28 comprises a sealed bellows which is responsive to the absolute pressure existing in the chamber 24. One end of the bellows 28 is anchored to the casing 23, as indicated at 30, and the other end controls the movement of a metering pin 31 which is cooperable with an outlet 32 connected through a tube 33 to the duct 15a, and thus in communication with ambient atmospheric pressure which comprises a region of lower pressure. A spring 35 urges the metering pin 31 in the closing direction.

The differential and ratio control mechanism includes a metering pin 36 which cooperates with an opening 37 to constitute the valve 27, there being a connection 38 between the opening 37 and the duct 15a. A lever 39 is pivoted to the casing 23 at 40 and controls the movement of the metering pin 36, said lever 39 being urged in the valve closing direction by a spring 41.

Connected to the end of the lever 39, opposite the pivot 40, is one end of a link 42, the other end of which is attached to the center of a diaphragm 43 which is clamped to a coupling 44, connected through a tube 45 to the throat 15a, and thus to ambient atmosphere so that the outer side of the diaphragm 43 is subjected to substantially ambient pressure while the inner side is subjected to the pressure within the chamber 24, the diaphragm 43 being adapted to respond to the differential between ambient pressure and the pressure within the chamber 24, thereby controlling the valve 27 in a manner to maintain within the chamber 24, and hence, the cabin, a pressure bearing a substantially fixed differential with respect to ambient pressure.

Ratio control is provided for by an evacuated bellows 46 having one end fixed. As shown, the fixed end of the bellows 46 is mounted upon a bracket 48 attached to the coupling 44. The free end of the bellows is provided with a head 50 which is urged toward an adjusting screw 51 by means of a compression spring, not shown, within said bellows 46. The screw 51 is mounted in the center of the diaphragm 43 and adjustment of said screw determines the point at which the head 50 of the bellows 46 will engage said screw.

Inasmuch as under certain operating conditions the operation of the ratio control may not be desired, there is provided means for rendering the ratio control inoperative under such conditions of operation. This means, which is termed a ratio lockout, includes a pressure responsive device, indicated generally at 60, and control means therefor, indicated generally at 61.

Figure 2:
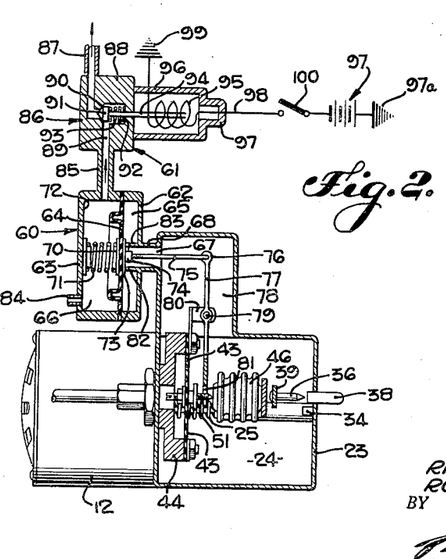
Fig. 2 is a diagrammatic view of the lockout mechanism.

The pressure responsive device 60 comprises a housing formed by a pair of housing members 62 and 63, between which a movable wall or diaphragm 64 is marginally clamped, thus dividing the interior of the housing into a pair of chambers 65 and 66 respectively. The chamber 65 is connected with the control chamber 24 by means of a passage 67 through a support 68 which serves as supporting means for the pressure responsive device.

Centrally of the diaphragm 64 and in chamber 66 there is a spring retainer 70 for reception of one end of a relatively light spring 71 which reacts between said spring retainer and the wall 72 of said chamber 66 which parallels said diaphragm. On the opposite side of the diaphragm 64 is a disc or clamping member 73 secured by any suitable well-known means to the spring retainer 70 so as to clamp the central area of said diaphragm between said retainer 70 and disc 73. The latter is provided with an axially extending, internally threaded boss 74 for reception of the threaded end of a pin or rod 75. The opposite end of said rod 75 is pivotally connected at 76 to one end of a lever 77 which extends into an outwardly extending pocket 78 of the control chamber. Lever 76 is pivoted at 79, intermediately of its ends, to a bracket 80 attached to any suitable fixed part such as the coupling 44. The end of the lever 77, opposite the pivot 76, is forked, the respective arms 81 of the forked end of said lever straddling the screw 51.

It is to be noted that the spring 71 urges the diaphragm 64 in a direction to move the forked end of the lever 77 toward the diaphragm 43, but such movement of the lever 77 is limited by stop means shown herein as an extension 82 of the supporting tube 68 so that under normal conditions the forked portion of lever 77 is disposed intermediately between the head 50 and the adjacent portion of the link 42 in spaced relation to both said head and link portion.

Pressure in the chamber 65 of the device 60 is maintained at substantially the same pressure as that in the chamber 24, it being noted that the passage 67 is substantially larger in cross section than the cross sectional area of the pin 75 so that there is free communication through said passage 67 which also has free communication with the chamber 65 through a plurality of openings 83 in the extension 82.

The chamber 66 of the device 60 has a bleed connection 84 with the cabin, said connection 84 being restricted. The chamber 66 is also connected with atmosphere through a conduit 85, valve 86 and conduit 87. The valve 86 comprises a head 88 having a passage 89 therein between the conduits 85 and 87. The passage 89 includes a valve seat 90 with which cooperates a movable valve member 91 disposed within a recess 92 of the head 88, and urged in the closing direction by a spring 93. The valve member 91 is provided with a stem 94 which extends into a solenoid coil 95 disposed within a housing 96, said coil 95 being connected to a suitable source of electrical energy, shown as a battery 97 grounded at 97a, by means of a wire 98, and said coil is grounded at 99. A switch 100 is interposed in the connection 98 for controlling the energization of the coil 95.

Let it be assumed that the airplane is operating in an altitude range wherein the head 50 of the bellows 46 would be in engagement with the screw 51, but that the switch 100 is closed to energize the solenoid coil 95 so that the valve 86 is open. The pressure in the chamber 66 will then be substantially atmospheric pressure inasmuch as the outlet from the chamber 66 to atmosphere is larger than the bleed inlet 84, so that the pressure in the chamber 65, which is substantially higher than the pressure in chamber 66, has caused the diaphragm 64 to move to the left, as shown in Fig. 2. This movement of the diaphragm 64 results in the forked end of the lever 77 engaging the head 50 of the bellows 46 and puts such pressure on the bellows as to maintain the head thereof out of engagement with the screw 51 even though the bellows otherwise would engage said screw and effect a ratio control of the regulator.

Should the airplane be about to engage in combat, the switch 100 is opened manually, thereby deenergizing the solenoid coil 95 and permitting the spring 93 to urge the valve member 91 against the seat 90, thereby cutting off the atmospheric connection of the chamber 66. Air from the cabin will gradually bleed into the chamber 66 and build up a sufficient pressure, in connection with the spring 71, to cause the diaphragm to move to the position shown in Fig. 2 and thereby allow the head 50 of the bellows 46 to engage the screw 51. Thereafter, the regulator will operate to maintain a ratio between cabin pressure and atmospheric pressure which will decrease with increasing altitude.

When the combat has terminated, the switch 100 may be closed to energize the solenoid 95 and effect opening of the valve 91 which permits rapid escape of air from the chamber 66. The pressure in said chamber 66 will drop rapidly, due to the fact that the air escape passages have a substantially larger capacity than the air inlet bleed 84.

Another type of pressure control mechanism or regulator, in which the present invention is embodied, is shown in Figs. 3 to 6. The regulator of this arrangement is installed within the enclosure or aircraft cabin and includes a main valve casing, indicated generally at 120, with the flange 121 thereof attached to the cabin wall 9, so that the outlet throat 122 of the casing 120 registers with an outlet 123 of the regulator outflow through the outlet 123 which is controlled by a valve element 124 slidably mounted within a skirt 125 in the casing 120.

Figure 4:
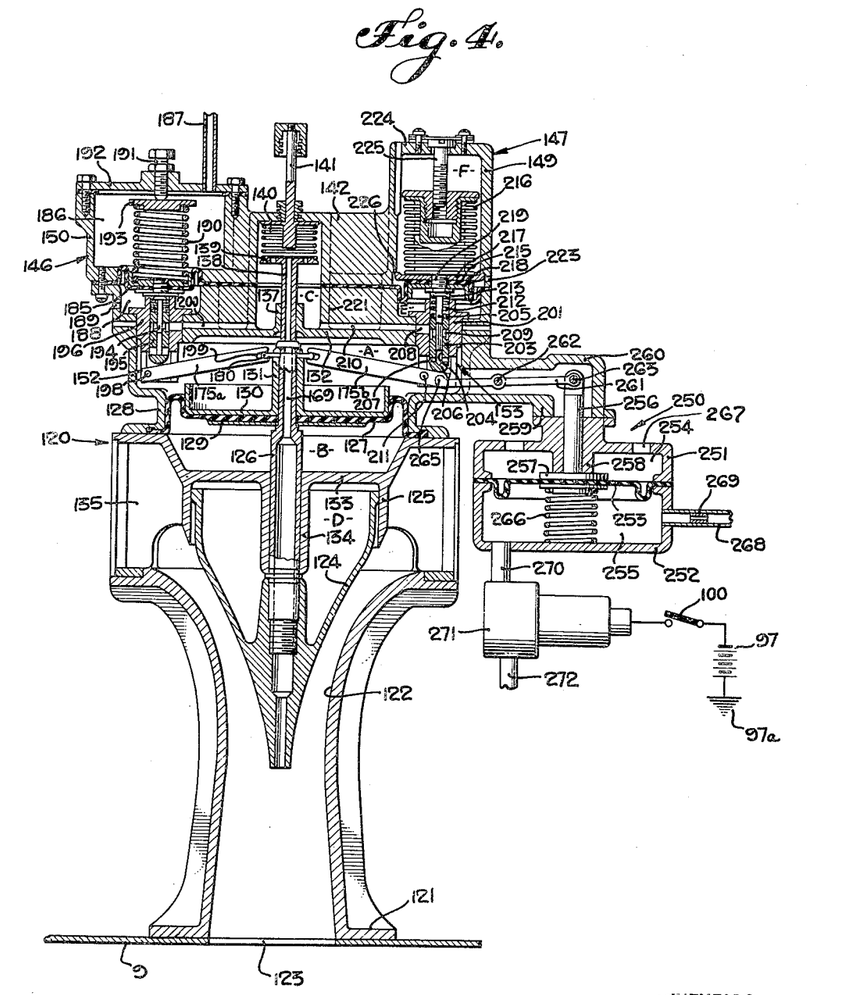
Fig. 4 is a sectional view of the regulator shown in Figure 3 taken on line 4—4 of Fig. 3 with the present invention shown in section as incorporated thereinto.

The valve 124 is suspended upon a tubular shaft 126 which in turn is carried by a diaphragm 127, the periphery of which is clamped between the valve housing 120 and a waist housing 128, and the inner region of which is clamped between a washer 129 and a cup 130, the latter having a hub 131 secured upon the shaft 126. The waist housing 128 has an upper wall 132 which cooperates with the diaphragm 127 to define a control chamber A, and the valve housing 120 has an upper wall 133 which cooperates with the diaphragm 127 to define a chamber B. The wall 133 is formed with a bearing sleeve 134 in which the shaft 126 is slidably mounted. The upper wall 133 is connected to the throat 122 of the valve casing 120 by webs 135, which defines a plurality of inlets for the flow of cabin air into the valve casing 120.

In a bearing collar 137 in the wall 132 is slidably mounted a tube 138 having at its upper end a head 139 which is subjected to spring force by a coil spring 140, the upper end of which is abutted against a lockout device 141 mounted in a casing head 142. The lower end of the tube 138 constantly engages and is sealed against the upper end of the tubular valve shaft 126, thus transferring the spring load to the diaphragm 127.

The diaphragm 127 responds to the opposing forces resulting from cabin pressure which is applied to the chamber B and the combination of the force applied by the spring 140 and the force resulting from a variable air pressure in the chamber A, which latter pressure may range between cabin pressure and ambient atmospheric pressure under the control of a series of control means, there being an isobaric control means or unit 145, a differential control means or unit 146, and a ratio control means or unit 147. The control units include respective casing members 148, 150 and 149, shown as formed integrally with the head or cover 142. Each unit also includes a pilot valve, the pilot valves for the respective units being indicated generally at 151, 152 and 153 respectively, mounted in the wall 132.

Figures 3, 5, 6:
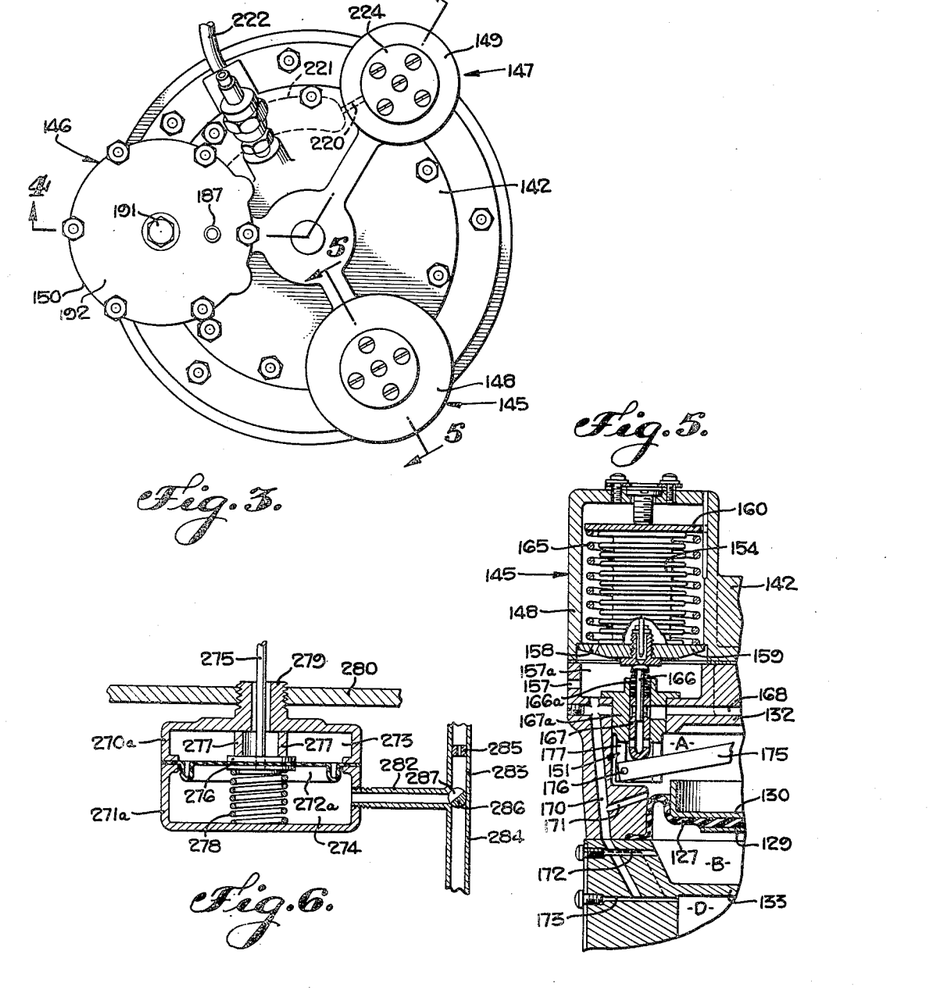
Fig. 3 is a plan view of another type of pressure regulator.
Fig. 5 is a sectional view taken on line 5—5 of Fig. 3.
Fig. 6 is a diagrammatic view of another arrangement of the lockout control mechanism.

The isobaric control unit, best shown in Fig. 5, comprises a pressure responsive means 154, shown as an evacuated bellows within the casing 148, said bellows being subjected to cabin pressure admitted through an opening 157, into the lower end of 157a of the casing 148, and passage 158 in a movable plate 159 carried by the adjacent end of the bellows 154. The opposite end of the bellows 154 is provided with an adjustable base 160 and a spring 165 which reacts between said base 160 and plate 159 urging expansion of the bellows 154.

The pilot valve 151 comprises a pin 166 actuated by the bellows 154, and a ported sleeve 167 slidable in a guide 167a mounted in the part 128, said pin being slidable in the sleeve. The pilot valve 151 controls a connection between the chamber A and a source of lower pressure, such as atmosphere, said connection comprising a passage 168 communicating with a chamber C which in turn is constantly connected with substantially atmospheric pressure through a passage 169 in the shaft 126 and a spring loaded tube 138. Chamber A is also connected with a source of higher pressure, such as the cabin, by means of a passage 170 in the casing 132 and a restricted passage 171. There is also a bore 172 leading from passage 170 to the chamber B, and a restricted bore 173 leading from a chamber D between the valve element 124 and the casing wall 133.

Escape of air from chamber A is controlled by the pilot valve 151 which, when open, allows air to flow from the chamber A to atmosphere so that there will be a pressure drop in chamber A, permitting the force resulting from the pressure in the chamber B to move the diaphragm 127 upwardly, thus effecting movment of the main valve 124 in the opening direction.

As a further consequence of the upward movement of the diaphragm 127, a lever 175, pivoted at 176 to the valve casing 177 and having a fork embracing the rim of a disk 180 carried by the hub member 131, will be shifted about its pivot to cause the sleeve 167 to move upwardly, thereby providing a "follow-up" action which will react upon the pilot valve so as to avoid hunting. A spring 166a reacts between the head of the pin 166 and the sleeve 167, thereby urging the pin into engagement with the plate 159 carried by the bellows 154 and urging the sleeve 167 into engagement with the lever 175.

The differential control means includes a pressure responsive device or diaphragm 185, responsive to the differential of pressure between that in a chamber 186 defined by casing 150, connected to atmosphere by a conduit 187, and a chamber 188 formed within the head 142, said chamber 188 being connected with the cabin by an opening 189. A spring 190 urges the diaphragm 185 downwardly, as shown in Fig. 4, the pressure of said spring on the diaphragm 185 being adjustable by means of a screw 191 which is threaded into an opening provided therefor in a cap 192 and which engages a spring retainer 193 at the upper end of said spring 190.

The pilot valve 152 of the differential control includes a movable pin 194 actuated by the diaphragm 185, said pin being slidable in a ported sleeve 195 which is slidable in a guide 196 mounted in the head 132. A spring 197 reacts between the head of the pin 194 and the sleeve 195 for urging the pin into operative engagement with the differential pressure responsive means and also urges the sleeve into operative engagement with a lever 175a pivoted at 198 to the valve casing 196 and provided with a fork 199 adjacent the opposite end, said fork being similar to the fork of lever 175 provided for the isobaric pilot valve. The arms of the fork 199 receive the rim of the disc 180 therebetween so that as the diaphragm 127 moves upwardly or downwardly the sleeve 195 will be correspondingly actuated. The pilot valve 152 controls the escape of air from chamber A to atmosphere by way of a passage 200 leading to the chamber C. The pilot valve of the ratio control unit includes a valve casing or guide 201 set into the wall 132 and having a bore in which is slidably mounted a valve sleeve 203 having bore 204. A valve pin 205, slidable in the bore 204, has a head 206 adapted, when the valve pin is retracted, to close the bore 204 against the passage of air from a port—or ports—207 in the lower end of the sleeve 203, communicating with the chamber A, to registering ports 208 and 209 in the valve casing 201 and sleeve 203 respectively. When the valve pin 205 is depressed as a result of the action of its respective pressure responsive control element, the head 206 is moved to a position where the bore 204 communicates with the port 207, whereby a line of communication is established from the chamber A through the port 207, bore 204, ports 208 and 209, and a bore 210 leading from the port 209 through the wall 132, to the low pressure chamber C. When the pilot valve opens, air will flow from the chamber A to the chamber C and there will be a resulting pressure drop in the chamber A, permitting the force resulting from the pressure in the chamber B to move the diaphragm 127 upwardly, thus moving the main control valve 124 in opening direction. As a further consequence of the upward movement of the diaphragm 127, lever 175b, pivoted at 211 to the valve casing 201 and having a fork 199 embracing the rim of a disc 180, will be shifted about its pivot 211 in clockwise direction, as viewed in Fig. 4, permitting the valve sleeve 203 to move downwardly slightly under the force of a coil spring 212 engaged between the head 213 of the valve 205 and the upper end of the valve sleeve 203. This produces a "follow-up" action which will react upon the pilot valve in a manner to close the pilot valve without waiting for the response of its pressure responsive control element to the altered cabin pressure condition, resulting from the changed position of the main valve 124.

Pin 205 is urged into engagement with the diaphragm 215 by spring 212, said diaphragm comprising a movable pressure responsive wall between a chamber E formed in the casing head 132 and a chamber F within the casing 149. An evacuated bellows 216 cooperates with the diaphragm 215 in controlling the pilot valve 153, said diaphragm 215 having a central portion clamped between a disc 217 and a cup 218, the parts being secured together by a screw 219.

Atmospheric pressure is applied to the underside of the diaphragm 215 in the chamber E through an opening 220 (Fig. 3) connecting the chamber E to an arcuate chamber 221 in the housing member 128, the chamber 221 being connected to atmosphere by a tube 222 (Fig. 3). The upper side of the diaphragm 215 is subjected to cabin pressure applied in the chamber F through an opening 223 in the wall of the casing member 149 (which is also applied to the evacuated bellows 216). The resultant force is equivalent to cabin pressure acting on an area representing the difference between the effective cross sectional area of the diaphragm 215 and the effective cross sectional area of the bellows 216. Stated somewhat differently, the diaphragm 215 is subjected to substantially zero pressure over the effective cross sectional area of the bellows 216 which is evacuated, such zero pressure being transmitted by the free lower end of the bellows 216, the upper end of the bellows being anchored to the top wall 224 of the casing member 149 by a stud 225. The area of the diaphragm 215 outside of the effective area of the bellows 216 is subjected to cabin pressure. The ratio of the area of the underside of the diaphragm 215 (exposed to ambient atmospheric pressure) to the area of the upper side of the diaphragm, against which cabin pressure is effective (the area lying outside the effective area of the bellows 216, as previously stated) is selected so as to equal the ratio between cabin pressure and atmospheric pressure that is fixed by the ratio control. As long as the ratio between cabin and ambient pressure is below the predetermined critical value, the upward force against the underside of the diaphragm 215 will overcome the downward force against the upper side of the diaphragm and the rim of the washer 217 will engage a shoulder 226 in the casing 149. As the ratio between cabin and ambient pressure approaches the critical value, however, the combination of forces acting downwardly (expansive spring force of the bellows 216 plus the force resulting from the effective air pressure against the upper side of the diaphragm 215) will overcome the combination of forces acting upwardly (force of the spring 212 added to the force resulting from the diminishing pressure in the chamber E) sufficiently to move the valve pin 205 downwardly, until the critical ratio is reached when these opposing forces will be balanced, with the valve 153 on the verge of opening.

With the arrangement of Figs. 3 to 5 hereinabove described, the cabin pressure is maintained substantially the same as atmospheric pressure up to a predetermined altitude. From this altitude to a second predetermined altitude pressure in the cabin is maintained at substantially a constant value by the isobaric control means which includes the pressure responsive means 154. Above the second predetermined altitude up to a third predetermined altitude the differential control, including the pressure responsive means 185, maintains a substantially fixed differential between cabin pressure and atmospheric pressure. Above the third predetermined altitude the ratio control mechanism will maintain a predetermined ratio between the pressure in the cabin and atmospheric pressure whenever said ratio control mechanism is operative.

Means locking out or rendering the ratio control inoperative is shown in Fig. 4 as comprising a control mechanism, indicated generally at 250, which includes a pair of casing members 251 and 252, between which a flexible diaphragm 253 is marginally clamped, thereby dividing the casing into an upper chamber 254 and a lower chamber 255, as shown in Fig. 4. The diaphragm 253 has a stem 256 centrally connected thereby by any suitable means, and said stem includes an enlarged head 257 which is urged against a stop 258, said stop being shown as forming an integral part of the casing member 251.

The upper casing member 251 is secured to the lower end of a downwardly extending part 259 of a hollow extension 260, said extension 260 being shown as formed integral with the head of the valve mechanism which carries the various controls. Within the extension 260 is disposed a lever 261 pivoted at 262 intermediate its ends. One end of the lever 261 is pivoted at 263 by means of a pin and slot arrangement to the upper end of the plunger 256, said upper end extending into the hollow interior of the extension 260. The opposite end of the lever 261 is forked and the arms 265 straddle the lever 175b of the ratio control so as not to interfere with the action thereof.

Normally the arms 265 are spaced from the adjacent end of the sleeve 203 and are maintained in this position by a spring 266 which is located in the chamber 255 and urges the diaphragm 253 upwardly against the stop 258.

The diaphragm 253 is shown as being subjected on its upper surface to cabin pressure, admitted into the chamber 254 by openings 267 which connects said chamber 254 with the cabin. The chamber 255 has a connection 268 with the cabin, said connection 268 having a restricted orifice 269 therein, so that cabin pressure is bled at a restricted rate from the cabin into the chamber 255. The chamber 255 also has a connection with atmosphere by means of a conduit 270, a valve 271, and conduit 272. The valve 271 is similar to the valve 86 shown in Fig. 2 and when the switch 100 is open the valve 271 is closed, so that the pressure in chamber 255 will be substantially the same as that in chamber 254, that is, the pressures on the opposite sides of diaphragm 253 will be substantially the same. At this time the ratio control mechanism will be operative. To render the ratio control mechanism inoperative, the switch 100 is closed to thereby open the valve 271, thereby allowing the air in chamber 255 to escape to atmosphere and reduce the pressure in said chamber to substantially atmospheric pressure. This will occur due to the fact that the bleed into chamber 255 from the cabin is restricted, whereas the outlet to atmosphere is substantially unrestricted. The cabin pressure on the upper side of diaphragm 253 will then overcome the force of spring 266 and cause the diaphragm to move downwardly for actuation of the lever 261, the arms 265 of which will then engage the lower end of the sleeve 203 and move said sleeve upwardly to thereby render the ratio control mechanism inoperative.

Opening of the switch 100 will effect closing of the valve 271 so that cabin pressure will be built up again in the chamber 255. The spring 266 will then move the diaphragm, plunger 256, and lever 261 to the position shown in Fig. 4.

The arrangement shown in Fig. 6 for controlling the ratio control comprises a housing having an upper casing member 270a and a lower casing member 271a, a diaphragm 272a being marginally clamped between said casing members to provide an upper chamber 273 and a lower chamber 274. An actuating rod 275 is secured to the diaphragm and has a plate 276 adapted to engage lugs 277 which extend inwardly of the chamber 273 and are shown as being formed integrally with the upper casing member 270. A spring 278 is disposed in the chamber 274 and urges the diaphragm 272 upwardly, as shown in Fig. 6. The upper casing member 270 is provided with an externally threaded extension 279 which is threaded into an opening provided therefor in a wall 280 of the control chamber. The extension 279 is provided with an opening therethrough of larger diameter than the diameter of the rod 275, so as to provide a passage from the control chamber into the chamber 273 so that the upper side of diaphragm 272 is subjected to control chamber pressure.

The chamber 274 is provided with a conduit 282 which branches at 283 and 284. The branch 283 is connected with ambient atmosphere and has a restricted orifice 285 therein. A valve 286 is provided for selectively connecting the chamber 274 with either ambient atmosphere or cabin pressure. The valve 286 is provided with a cutaway portion 287 so that when said valve is in one position the chamber 274 will be connected with atmosphere. When the valve is in another position the chamber 274 will be connected with the cabin.

The rod 275 may be connected to the lever 77, Fig. 2, or lever 261, Fig. 4, and when it is desired to render the ratio control effective, the valve 186 is moved to the position for connecting the chamber 274 with the cabin. When it is desired to render the ratio control ineffective the valve 286 is turned or moved to the position shown in Fig. 6, whereat the chamber 274 is connected to atmosphere.

The valve 286 may be controlled by a solenoid which in turn is controlled by a manually operated switch.

It is to be understood, of course, that the valve member 91 of the solenoid valve 86, may be arranged so as to be normally open and held closed by the solenoid when energized.

Also the lockout arrangement may be such that the absolute pressure responsive means or bellows is locked out when the pneumatic control device is not connected with atmosphere or other region of lower pressure and said bellows permitted to cooperate with the differential pressure responsive means when said pneumatic device is connected with said region of lower pressure.

We claim:

1. In means for controlling the pressure in a control pressure chamber of pressure regulating means: ratio control means for controlling the pressure in said control pressure chamber so as to maintain the pressure between that in said chamber and pressure outside thereof at a predetermined ratio; means for rendering said ratio control means inoperative; means for controlling said means for rendering said ratio control means operative, including a movable wall responsive to variations in the differential of pressure on opposite sides thereof; means forming a pressure chamber having an inlet passage and an outlet passage, one side of said wall being subjected to the pressure in said chamber and the opposite side being subjected to a region of pressure of substantially the same value as that in said control pressure chamber, one of said passages connecting said chamber to the region of different pressure; and means controlling said one passage.

2. In means for controlling the pressure in a control pressure chamber: differential and ratio control means for controlling the pressure in said chamber, said differential and ratio control means including a movable wall responsive to variations in the differential of pressure on opposite sides thereof for maintaining a differential pressure between that in said chamber and pressure outside said chamber in a differential range of operation, and an absolute pressure responsive device cooperable with said wall in a ratio control range of operation for maintaining a predetermined ratio between the pressure in said chamber and said outside pressure; means for preventing said absolute pressure responsive device from cooperating with said movable wall; means for controlling the last mentioned means, including a movable wall responsive to variations in the differential of pressure on opposite sides thereof; means forming a pressure chamber having an inlet passage and an outlet passage, one side of said wall being subjected to pressure in said chamber and the opposite side being subjected to a region of pressure of substantially the same value as the pressure in said control pressure chamber, one of said passages being adapted to connect said pressure chamber with a region of different pressure; and means for controlling said one passage.

3. In mechanism for controlling the pressure within an enclosure: walls defining a control pressure chamber; pressure control means for said control chamber including pressure responsive means responsive to the differential between control chamber pressure and the pressure exterior of said enclosure so as to maintain the pressure in said chamber at a predetermined differential with respect to the pressure outside said enclosure; means including a pressure responsive element responsive to the pressure within said control pressure chamber when the pressure in said chamber drops to a predetermined value to cooperate with and modify the operation of said pressure responsive means for said control chamber whereby said pressure control means will maintain the pressure in said control pressure chamber at a predetermined ratio with respect to pressure outside said enclosure; and means for selectively rendering said pressure responsive element inoperative to modify the action of said pressure responsive means.

4. In mechanism for controlling the pressure in an enclosure: walls defining a control pressure chamber; a movable pressure sensitive control element subjected on one side to enclosure pressure and on the other side to control chamber pressure; means for controlling the pressure in said control chamber, including a differential control element responsive to variations in the differential of pressure between that in the control chamber and ambient atmospheric pressure, and a pressure responsive device subjected to control chamber pressure cooperable with said differential pressure responsive element in a ratio range of operation to modify the action of said pressure responsive element to effect a ratio control and inoperative below a ratio range of operation; and means for selectively rendering inoperative said pressure responsive device in the ratio range.

5. Mechanism for controlling the pressure in an enclosure, including: walls defining a control pressure chamber; valve means for controlling the outflow of air from said enclosure including a movable pressure sensitive control element subjected on one side to enclosure pressure and on the other side to control chamber pressure; an absolute pressure responsive device for controlling the pressure in said control chamber in an isobaric range of operation; pressure responsive means for controlling the pressure in said control chamber in a differential range of operation for maintaining a substantially fixed differential of pressure between that in the enclosure and ambient atmosphere; absolute pressure responsive means adapted to cooperate with said differential pressure responsive device in a ratio range of operation, for maintaining a predetermined ratio between the pressure in the enclosure and the pressure outside the enclosure; pneumatic means for locking out the absolute pressure responsive means so as to prevent cooperation between said device and the differential pressure responsive device; and means for controlling the lockout means.

6. In mechanism for controlling the pressure within an enclosure: walls defining a control pressure chamber; valve means for controlling the escape of air from said enclosure including a movable pressure sensitive control element subjected on one side to control chamber pressure; pressure control means for said control chamber including a differential pressure responsive device having one side subjected to pressure outside the enclosure and the other side subjected to control chamber pressure, and means, including an absolute pressure responsive device responsive to control chamber pressure and cooperable with said differential pressure responsive device for effecting a ratio control so as to maintain a predetermined ratio between that in the control chamber, and hence in the enclosure, in a ratio range of operation; and means for selectively rendering the absolute pressure responsive device inoperative in said ratio range.

7. In mechanism for controlling the pressure within an enclosure: walls defining a control pressure chamber; valve means for controlling the flow of air through an opening of said enclosure including a movable pressure sensitive control element subjected on one side to enclosure pressure and on the other side to control chamber pressure; pressure control means for said control chamber including a pressure responsive means responsive to the differential between control chamber pressure and the pressure exterior of said enclosure adapted to maintain the pressure in said chamber at a predetermined differential with respect to the pressure outside said enclosure; means including a pressure responsive element responsive to the pressure within said control pressure chamber operable in a ratio range of operation above the differential range to vary the operation of said pressure control means for said control chamber whereby said pressure control means will maintain the pressure in said control pressure chamber at a predetermined ratio with respect to the pressure outside the enclosure; pneumatic means for rendering the pressure responsive element inoperative to vary the operation of said pressure control means for said control chamber; and means for controlling said pneumatic means.

8. The invention defined by claim 7, wherein the control means for the pneumatic means comprises electrical means.

9. The invention defined by claim 7, wherein the pneumatic means comprises a movable pressure responsive wall; means for defining pressure chambers, said movable wall having its opposite side subjected to the pressure in the respective chambers; means for connecting one of said chambers with the pressure in said control chamber; means for connecting the other chamber with a source of higher pressure; means for connecting said other chamber with a region of lower pressure; and electrical means for controlling the last mentioned connection.

10. In mechanism to control the pressure in an enclosure: walls defining a control pressure chamber; a movable pressure sensitive element, one side of said element being subjected to the pressure in said chamber; means for controlling the pressure in said chamber, said means including a movable wall responsive to variations in the differential of pressure on opposite sides thereof for maintaining a predetermined differential between the pressure in said chamber and pressure outside said enclosure, and ratio control means for said control means, said ratio control means including an absolute pressure responsive device cooperable with said movable wall and subjected to control chamber pressure; and pneumatic means for controlling the absolute pressure responsive device to selectively render said device operative and inoperative to cooperate with said movable wall.

11. In mechanism to control the pressure in an enclosure: walls defining a control pressure chamber; means for controlling the pressure in said chamber, said means including a movable wall responsive to variations in the differential of pressure on opposite sides thereof for maintaining a predetermined differential between the pressure in said chamber and pressure outside said enclosure, and ratio control means for said control means, said ratio control means including an absolute pressure responsive device; pneumatic means for controlling the absolute pressure responsive device to selectively render said device operative and inoperative, said pneumatic means comprising a movable wall responsive to the variations in the differential of pressure on opposite sides thereof, one side of said movable wall being subjected to a relatively high pressure; walls defining a pressure chamber, the opposite side of said wall being subjected to the pressure in said pressure chamber; means for connecting said pressure chamber with a source of relatively high pressure; means for connecting said pressure chamber with a region of lower pressure; and manually controlled means for controlling the last mentioned connection.

12. In mechanism to control the pressure in an enclosure: walls defining a control pressure chamber; a movable pressure sensitive element, one side of said element being subjected to the pressure in said chamber; means for controlling the pressure in said chamber, said means including a movable wall responsive to variations in the differential of pressure on opposite sides thereof for maintaining a predetermined differential between the pressure in said chamber and pressure outside said enclosure, and ratio control means for said control means, said ratio control means including an absolute pressure responsive device; pneumatic means for controlling the absolute pressure responsive device to selectively render said device operative and inoperative, said pneumatic means comprising a movable wall responsive to the variations in the differential of pressure on opposite sides thereof, one side of said movable wall being subjected to a relatively high pressure; walls defining a pressure chamber, the opposite side of said wall being subjected to the pressure in said pressure chamber; restricted means for connecting said pressure chamber with a source of relatively high pressure; means for connecting said pressure chamber with a region of lower pressure; and manually controlled means for controlling the last mentioned connection.

13. In mechanism for controlling the pressure in an enclosure: walls defining a control pressure chamber; means for controlling pressure in said control chamber including a pressure responsive movable wall subjected on one side to control chamber pressure and on the opposite side to pressure outside the enclosure, and a pressure responsive device, responsive to the absolute pressure in the control chamber, said movable wall being adapted to maintain a substantially fixed differential of pressure between that in the control chamber and pressure outside the enclosure and said device being adapted to cooperate with said wall for maintaining a predetermined ratio between the pressure in the control chamber and outside pressure; and means for preventing the cooperative action of said device with said wall, said means including a pressure responsive element subjected on one side to control chamber pressure, walls defining a pressure chamber for subjecting the opposite side of said pressure responsive element to the pressure in said pressure chamber, said pressure chamber having a restricted connection with a source of relatively high pressure and a connection with a region of relatively low pressure; an electrically operated valve for controlling the last mentioned connection; and means for manually controlling said valve.

14. In mechanism for controlling the pressure within an enclosure: means for controlling said enclosure pressure including a pressure sensitive element subjected on one side to enclosure pressure; means defining a control pressure chamber, the opposite side of said pressure sensitive element being subjected to the pressure in said control chamber; means for controlling the pressure in said control pressure chamber including a differential pressure responsive device subjected on one side to enclosure pressure and on the opposite side to ambient atmospheric pressure, said differential pressure responsive device controlling the pressure in said control chamber in a differential range of operation; a ratio control device for controlling the pressure in said chamber, independently of the differential control device; and means for controlling the ratio control device, said means including a movable wall subjected on one side to enclosure pressure, walls defining a pressure chamber for subjecting the opposite side of said wall to the pressure in said pressure chamber, a restricted connection between the enclosure and said pressure chamber and a connection between said pressure chamber and ambient atmosphere; an electrically operable valve controlling the last named connection; and manual means for controlling said valve.

15. In mechanism for controlling the pressure in an enclosure: means for controlling the pressure in said chamber including a pressure responsive element subjected on one side to the pressure in said chamber and on the other side to pressure outside the enclosure; an absolute pressure responsive device subjected to pressure in said chamber and cooperable in a ratio control range with the pressure responsive element for maintaining predetermined ratio between the pressure in the control chamber and pressure outside of said enclosure; and means for selectively controlling the absolute pressure responsive device, said means including a pressure responsive wall subjected on one side to the pressure in said control chamber; walls defining a pressure chamber, the opposite side of said movable wall being subjected to the pressure in said pressure chamber; means for connecting said pressure chamber with a source of higher pressure and a region of lower pressure; and valve means for controlling said connection, said valve means having one position whereat the pressure chamber is connected with said source of higher pressure and another position whereat said pressure chamber is connected with said region of lower pressure.

16. The invention defined by claim 15, wherein there is restricting means for restricting the passage of air through said connection when connected with said region of lower pressure.

17. In a control device for selectively rendering inoperative a pressure responsive device of an enclosure pressure regulating mechanism: a pressure responsive element; means cooperable with said pressure responsive element and movable thereby to render the pressure responsive device inoperative in performing its presure regulating function in the enclosure pressure regulating mechanism; walls defining a pressure chamber, said pressure responsive element being subjected on one side to pressure in said chamber and being adapted to be subjected on the opposite side to a relatively high pressure; said chamber having an outlet and a restricted inlet; a valve controlling said outlet; yielding means urging said valve in the closing direction; electrical means for opening said valve; and manual means for controlling said electrical means.

18. In mechanism for controlling the pressure within an enclosure: walls defining a control pressure chamber; pressure control means for said control chamber including a pressure responsive means responsive to the differential between control chamber pressure and the pressure exterior of said enclosure adapted to maintain the pressure in said chamber at a predetermined differential with respect to the pressure outside said enclosure; means including a pressure responsive element responsive to the pressure within said control pressure chamber operable in a ratio range of operation above the differential range to vary the operation of said pressure control means for said control chamber whereby said pressure control means will maintain the pressure in said pressure chamber at a predetermined ratio with respect to the pressure outside the enclosure; and electrically controlled means for rendering the pressure responsive element inoperative.

19. In a pressure control mechanism for controlling the pressure in an enclosure: a control chamber; a movable pressure sensitive element subjected to chamber pressure on one side and enclosure pressure on the other side whereby a change in either of said pressures will cause movement of said element; a differential and ratio control unit having a movable wall responsive to variations in the differential of pressure between that in said chamber and atmosphere, operable throughout a differential range of operation of said pressure control mechanism for maintaining substantially fixed differential pressure in said control chamber with respect to atmospheric pressure, said unit also including a pressure responsive device which cooperates with said movable wall, when the differential of pressure between that in the control chamber and atmosphere reaches a predetermined value, to change the response characteristics of said wall to effect a decrease in chamber pressure with respect to atmosphere as altitude increases; and electrically controlled means for preventing the pressure responsive device from cooperating with said movable wall.

20. In means for controlling the pressure in a control pressure chamber of pressure regulating means: differential pressure and ratio control means, including a movable wall responsive to variations in the differential of pressure on opposite sides thereof for maintaining a predetermined differential pressure between that in the control pressure chamber and a reference pressure, and absolute pressure responsive means responsive to the pressure in the control pressure chamber cooperable with said movable wall in a ratio control range of operation for modifying the action of said movable wall to thereby maintain a predetermined ratio between the pressure in the control pressure chamber and said reference pressure; and means for rendering said absolute pressure responsive means inoperable at times when said absolute pressure responsive means would otherwise cooperate with said movable wall so that the movable wall will function alone to maintain said differential pressure in the control chamber in the differential range.

21. In a mechaninm for controlling the pressure within an enclosure: walls defining a control pressure chamber; valve means for controlling the flow of air through an opening of said enclosure including a movable pressure sensitive control element subjected on one side to enclosure pressure and on the other side to control chamber pressure; pressure control means for said control chamber including pressure responsive means responsive to the differential between control chamber pressure and the pressure exterior of said enclosure so as to maintain the pressure in said chamber at a predetermined differential with respect to the pressure outside said enclosure; means including a pressure responsive element responsive to the pressure within said control pressure chamber in a ratio range of operation above the differential range to vary the operation of said pressure control means for said control chamber whereby said pressure control means will maintain the pressure in said pressure chamber at a predetermined ratio with respect to the pressure outside the enclosure; and means for selectively rendering inoperative said pressure responsive element.

22. Mechanism for controlling the pressure in an enclosure, including: walls defining a control pressure chamber; valve means for controlling the outflow of air from said enclosure including a movable pressure sensitive control element subjected on one side to enclosure pressure and on the other side to control chamber pressure; an absolute pressure responsive device for controlling the pressure in said control chamber in an isobaric range of operation; pressure responsive means for controlling the pressure in said control chamber in a differential range of operation for maintaining a substantially fixed differential of pressure between that in the enclosure and ambient atmosphere; absolute pressure responsive means adapted to mechanically cooperate with said differential pressure responsive means in a ratio range of operation, for maintaining a predetermined ratio between the pressure in the enclosure and the pressure outside the enclosure; pneumatic means for locking out the absolute pressure responsive means so as to prevent cooperation between said means and the differential pressure responsive means; and means for controlling the lockout means.

23. In mechanism for controlling the pressure within an enclosure: walls defining a control pressure chamber; valve means for controlling the escape of air from said enclosure including a movable pressure sensitive control element subjected on one side to control chamber pressure; pressure control means for said control chamber including an absolute pressure responsive device controlling the escape of air from the control chamber, a differential pressure responsive device having one side subjected to pressure outside the enclosure and the other side subjected to control chamber pressure, and means, including said differential pressure responsive device and a second absolute pressure responsive device responsive to control chamber pressure cooperable therewith for effecting a ratio control so as to maintain a predetermined ratio between that in the control chamber, and hence in the enclosure, and ambient atmosphere in a ratio range of operation; and means for rendering the second absolute pressure responsive device inoperative in said ratio range so that said differential pressure responsive device operates alone to maintain the pressure in the control chamber at a predetermined differential pressure with respect to ambient atmosphere above the normal differential range.

24. Mechanism for controlling the pressure in an enclosure, including: walls defining a control pressure chamber; an absolute pressure responsive device for controlling the pressure in said control chamber in an isobaric range of operation; differential pressure responsive means for controlling the pressure in said control chamber in a differential range of operation for maintaining a substantially fixed differential pressure between that in the enclosure and ambient atmosphere, said differential range being above the isobaric range; absolute pressure responsive means adapted to cooperate with the differential pressure responsive means above the differential range for maintaining a predetermined ratio between the pressure in the enclosure and the pressure outside the enclosure; pneumatic means for locking out the absolute pressure responsive means so as to prevent cooperation between said means and differential pressure responsive means and means for controlling the lockout means.

25. Mechanism for controlling the pressure in an enclosure, including: walls defining a control pressure chamber; means for controlling the outflow of air from said enclosure including a movable pressure sensitive control element subjected on one side to enclosure pressure and on the other side to control chamber pressure; means for controlling the pressure in said control pressure chamber including an absolute pressure responsive device for controlling the pressure in said chamber in an isobaric range of operation between two predetermined altitudes; differential pressure responsive means for controlling the pressure in said control chamber in a differential range of operation between the higher of said predetermined altitudes and a third higher predetermined altitude, said differential pressure responsive means being responsive to variations in the differential of pressure between that in the control pressure chamber and ambient atmospheric pressure to maintain a substantially fixed differential between said pressures; absolute pressure responsive means responsive to control chamber pressure and adapted to cooperate with said differential pressure responsive means when the pressure in the control pressure chamber drops below a predetermined value so as to maintain a predetermined ratio between the pressure in said chamber and ambient atmospheric pressure; pneumatic means for locking out the last mentioned absolute pressure responsive means so as to prevent cooperation between said means and the differential pressure responsive means; and means for controlling the lockout means.

26. Mechanism for controlling the pressure in an enclosure, including: walls defining a control pressure chamber; an absolute pressure responsive device for controlling the pressure in said control chamber in an isobaric range of operation; pressure responsive means for controlling the pressure in said control chamber in a differential range of operation for maintaining a substantially fixed differential of pressure between that in the enclosure and ambient atmosphere; absolute pressure responsive means adapted to cooperate with said differential pressure responsive device in a ratio range of operation, for maintaining a predetermined ratio between the pressure in the enclosure and the pressure outside the enclosure; pneumatic means for locking out the absolute pressure responsive means so as to prevent cooperation between said device and the differential pressure responsive device so that said differential pressure responsive device will function alone; and means for controlling the lockout means.

References Cited in the file of this patent

UNITED STATES PATENTS

| Number | Name | Date |
|---|---|---|
| 1,853,194 | Bogle | Apr. 12, 1932 |
| 2,419,707 | Cooper et al. | Apr. 29, 1947 |
| 2,463,487 | Widgery et al. | Mar. 1, 1949 |
| 2,466,465 | Morris | Apr. 5, 1949 |
| 2,477,005 | Paget | July 26, 1949 |
| 2,498,633 | Arthur | Feb. 28, 1950 |
| 2,590,330 | Krueger | Mar. 25, 1952 |